US010197152B2

(12) United States Patent
Volkmer et al.

(10) Patent No.: US 10,197,152 B2
(45) Date of Patent: Feb. 5, 2019

(54) DRIVE WHEEL ASSEMBLY FOR AN AGRICULTURAL VEHICLE

(71) Applicant: CNH Industrial America LLC, New Holland, PA (US)

(72) Inventors: Michael J. Volkmer, Plainfield, IL (US); Peter Douglas Bosma, Downers Grove, IL (US); Russell Victor Stoltman, Frankfort, IL (US)

(73) Assignee: CNH Industrial America LLC, New Holland, PA (US)

( * ) Notice: Subject to any disclaimer, the term of this patent is extended or adjusted under 35 U.S.C. 154(b) by 189 days.

(21) Appl. No.: 14/567,848

(22) Filed: Dec. 11, 2014

(65) Prior Publication Data

US 2015/0159746 A1 Jun. 11, 2015

Related U.S. Application Data (60) Provisional application No. 61/914,675, filed on Dec. 11, 2013.

(51) Int. Cl.
*F16H 57/08* (2006.01)
*F16C 35/04* (2006.01)
(Continued)

(52) U.S. Cl.
CPC ........... *F16H 57/082* (2013.01); *B60B 27/00* (2013.01); *B60B 27/001* (2013.01);
(Continued)

(58) Field of Classification Search
CPC ................... F16H 2057/02056; B60B 35/125
See application file for complete search history.

(56) References Cited

U.S. PATENT DOCUMENTS 2,802,542 A * 8/1957 Gerst ................... B60K 17/043
180/371
3,828,627 A 8/1974 Schwerdhofer
(Continued)

FOREIGN PATENT DOCUMENTS

CN 201703522 1/2011
DE 2316932 * 10/1974 ............... B60K 7/00
(Continued)

OTHER PUBLICATIONS

Steiger Raba Axel, Nov. 23, 2008, http://www.bigtractorparts.com/downloads/AxleSrvPub/RabaK598_0_10_srv_manFnIDrv_SM2.pdf, accessed Oct. 4, 2013.
(Continued)

*Primary Examiner* — Robert W Hodge
*Assistant Examiner* — Lori Wu
(74) *Attorney, Agent, or Firm* — Rickard K. DeMille; Rebecca L. Henkel (57) ABSTRACT

An agricultural vehicle may include a drive wheel assembly that includes a central shaft driven by a motor of the agricultural vehicle, and a planet gear system driven by the central shaft. The planet gear system includes a sun gear coupled to the central shaft, multiple planet gears disposed around the sun gear and driven by the sun gear, a ring gear disposed around the planet gears and driven by the planet gears, and a planet carrier directly coupled to each planet gear and configured to provide support to each planet gear. The drive wheel assembly may include multiple bearing assemblies, at least one of which is supported by the planet carrier. The multiple bearing assemblies may also be disposed on opposite sides of the planet gear system.

19 Claims, 10 Drawing Sheets

(51) Int. Cl.
    *B62D 55/12*  (2006.01)
    *B60K 17/04*  (2006.01)
    *B60B 27/00*  (2006.01)

(52) U.S. Cl.
    CPC ........ *B60B 27/0005* (2013.01); *B60K 17/046* (2013.01); *B62D 55/12* (2013.01); *F16C 35/042* (2013.01); *B60Y 2200/221* (2013.01)

(56) References Cited

U.S. PATENT DOCUMENTS

| | | | |
|---|---|---|---|
| 3,954,026 A * | 5/1976 | Rittmann | B60B 27/0047 180/308 |
| 4,883,373 A | 11/1989 | Rieke | |
| 5,024,636 A | 6/1991 | Phebus et al. | |
| 5,087,230 A | 2/1992 | Yates et al. | |
| 5,769,751 A | 6/1998 | Forster | |
| 6,139,464 A * | 10/2000 | Roske | B60K 7/0007 180/65.6 |
| 6,318,484 B2 * | 11/2001 | Lykken | 180/9.1 |
| 6,374,933 B1 * | 4/2002 | Ruppert, Jr. | B62D 21/14 180/9.44 |
| 6,527,671 B2 | 3/2003 | Paalasmaa et al. | |
| 7,384,367 B2 | 6/2008 | Radinger et al. | |
| 7,445,067 B2 | 11/2008 | Marsh et al. | |
| 2001/0025732 A1 * | 10/2001 | Lykken | B62D 49/0678 180/9.48 |
| 2002/0117342 A1 * | 8/2002 | Schoenfelder | B62M 27/02 180/182 |
| 2004/0082420 A1 | 4/2004 | Robinson | |
| 2006/0027414 A1 * | 2/2006 | Bordini | B60G 3/12 180/363 |
| 2011/0003661 A1 | 1/2011 | Varela | |
| 2013/0012348 A1 | 1/2013 | Oliver et al. | |
| 2013/0023371 A1 | 1/2013 | Yun | |
| 2013/0105186 A1 | 5/2013 | Pedersen | |

FOREIGN PATENT DOCUMENTS

| | | | |
|---|---|---|---|
| DE | 102004043287 | * 3/2006 | ............ B60K 17/28 |
| EP | 1544504 | 6/2005 | |
| EP | 2072858 | 6/2009 | |
| GB | 2055714 | 3/1981 | |
| WO | 8201753 | 5/1982 | |
| WO | 8300200 | 1/1983 | |
| WO | 9718407 | 5/1997 | |
| WO | 9846444 | 10/1998 | |

OTHER PUBLICATIONS

Schaeffler Techlologies, "Planetary Gear Bearing Arrangements in Industrial Gearboxes," 2012, http://www.schaeffler.com/remotemedien/media/_shared_media/08_media_library/01_publications/schaeffler_2/tip/downloads_8/tpi_008_de_en.pdf, accessed Oct. 4, 2013.

* cited by examiner

DRIVE WHEEL ASSEMBLY FOR AN AGRICULTURAL VEHICLE

CROSS REFERENCE TO RELATED APPLICATIONS

This application claims priority from and the benefit of U.S. Provisional Patent Application No. 61/914,675, entitled "Drive Wheel Assembly for an Agricultural Vehicle," filed Dec. 11, 2013, which is hereby incorporated by reference in its entirety.

BACKGROUND

The subject matter disclosed herein relates generally to agricultural vehicles, such as tractors. Specifically, the subject matter relates to a drive wheel assembly for an agricultural vehicle.

Many agricultural vehicles (e.g., tractors, combines, sprayers, etc.) include drive wheel assemblies that translate power provided by a vehicle motor into a propelling motion. A drive wheel assembly may include a planet gear system and a drive wheel. During operation, at least one of the components of the planet gear system rotates when driven by the vehicle motor. The at least one rotating component of the planet gear system causes the drive wheel to rotate, thereby propelling the vehicle in a particular direction.

In recent years, many agricultural vehicles have begun to include motors that can provide increased amounts of power. However, the drive wheel assembly may not be able to support the larger amounts of power supplied by the motor of the agricultural vehicle without significant drawbacks. For example, the components (e.g., gears) of the drive wheel assembly may need to be larger to accommodate a larger amount of power. There may not be sufficient space for larger components within the drive wheel assembly, resulting in interference between different components within the drive wheel assembly during operation. Furthermore, larger components may negatively affect the weight distribution of the drive wheel assembly relative to the agricultural vehicle.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, an agricultural vehicle may include a drive wheel assembly. The drive wheel assembly may include a central shaft driven by a motor of the agricultural vehicle, and a planet gear system driven by the central shaft. The planet gear system includes a sun gear coupled to the central shaft, multiple planet gears disposed around the sun gear and driven by the sun gear, a ring gear disposed around the planet gears and driven by the planet gears, and a planet carrier directly coupled to each planet gear and configured to provide support to each planet gear. The drive wheel assembly may also include multiple bearing assemblies, at least one of which is supported by the planet carrier.

In another embodiment, an agricultural vehicle may include a drive wheel assembly. The drive wheel assembly may include a central shaft driven by a motor of the agricultural vehicle, and a planet gear system driven by the central shaft. The planet gear system includes a sun gear coupled to the central shaft, multiple planet gears disposed around the sun gear and driven by the sun gear, a ring gear disposed around the planet gears and driven by the planet gears, and a planet carrier directly coupled to each planet gear and configured to provide support to each planet gear. The drive wheel assembly may include one bearing assembly may be disposed between the center of the agricultural vehicle and the planet gear system, and another bearing assembly may be disposed between the planet gear system and the exterior of the drive wheel assembly.

In yet another embodiment, an agricultural vehicle may include a drive wheel assembly. The drive wheel assembly may include a central shaft driven by a motor of the agricultural vehicle, and a planet gear system driven by the central shaft. The planet gear system includes a sun gear coupled to the central shaft, multiple planet gears disposed around the sun gear and driven by the sun gear, a ring gear disposed around the planet gears and driven by the planet gears, and a planet carrier directly coupled to each planet gear and configured to provide support to each planet gear. The drive wheel assembly may include two bearing assemblies may be disposed on opposite sides of the planet gear system, and at least one bearing assembly may be supported by the planet carrier.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. The embodiments described below are described relative to a coordinate system that includes an x-axis, a y-axis, and a z-axis and which originates at the center of an agricultural vehicle. The x-axis corresponds to an axis intersecting the center of an agricultural vehicle and extending along the width of the vehicle. The y-axis corresponds to a vertical axis intersecting the center of an agricultural vehicle. The z-axis corresponds to an axis intersecting the center of an agricultural vehicle and extending along the length of the vehicle. The terms "outside" and "inside" are intended to convey the relative location of a component or components to the center of an agricultural vehicle along the x-axis. For example, if component a is described as outside of component b, then it should be understood that component a is further away from the center of the vehicle than component b. Similarly, if component b is described as inside of component a, then it should be understood that component b is closer to the center of the vehicle than component a.

Present embodiments relate to drive wheel assemblies for agricultural vehicles. Specifically, the embodiments described herein related to configurations of drive wheel assemblies that include a planet gear system coupled to a drive wheel. The planet gear system may be disposed in an outer portion of the drive wheel assembly, and bearing assemblies may be disposed on either side of the planet gear system. In particular, the planet gear system may include a planet carrier that supports at least one of the bearing assemblies.

The drive wheel assemblies described herein may have improved spatial, weight, and load distribution as compared to drive wheel assemblies in other agricultural vehicles. The improved spatial, weight, and load distribution may lead to benefits that include, but are not limited to, a reduced likelihood of interference between components, space for components that may accommodate a higher amount of power, and/or self-cleaning features.

Figure 1:
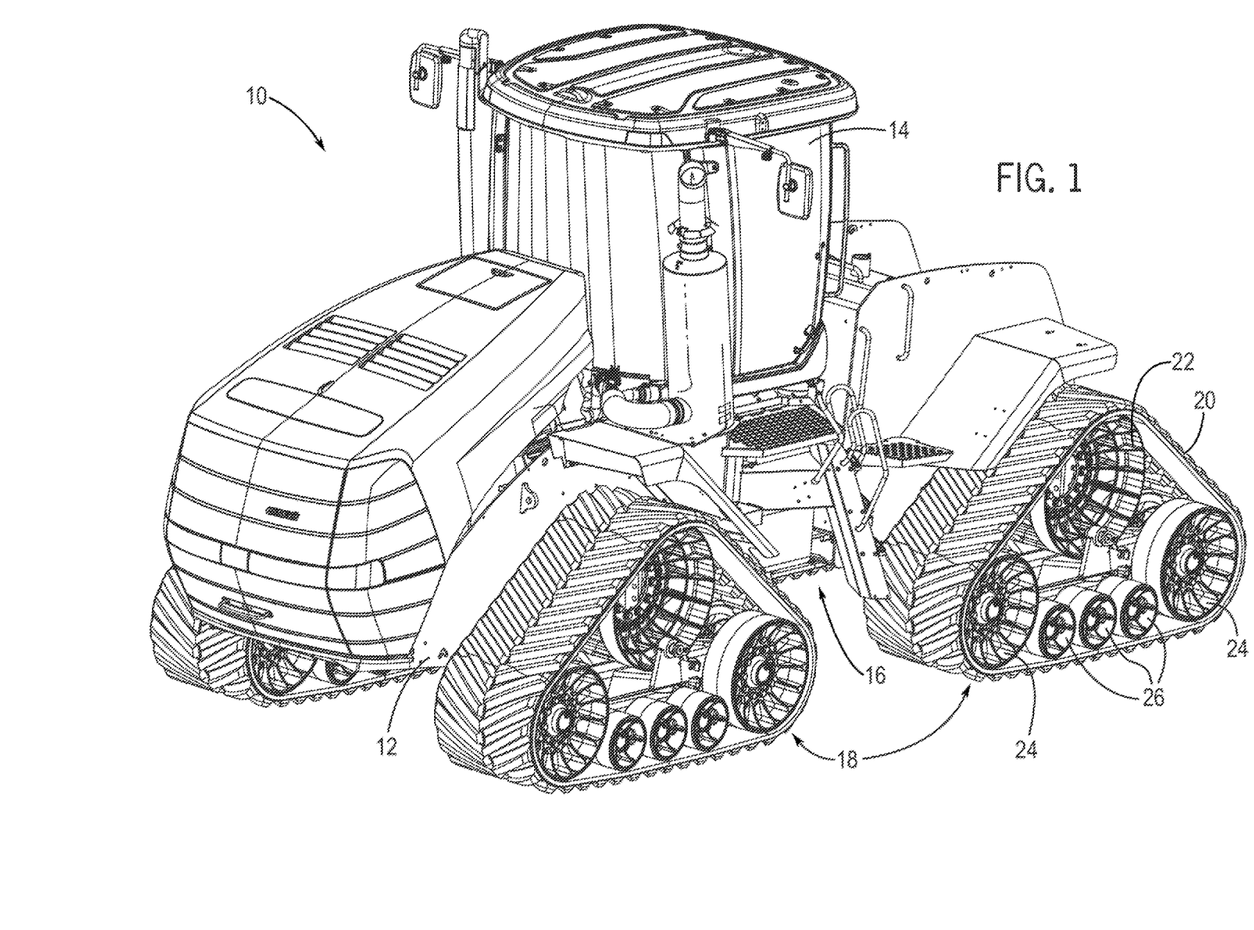
FIG. 1 is a perspective view of an embodiment of a tractor utilizing a continuous track system.

With the foregoing in mind, FIG. 1 illustrates an agricultural vehicle, in this case a tractor 10. The tractor 10 generally includes a vehicle body or chassis 12 that may be built around a mechanical frame in a conventional manner. The chassis supports the power plant, transmission, and all support systems of the vehicle. An operator cab 14 is mounted on the chassis frame by a suspension system 16. The vehicle is moved by tracks 18, some or all of which may be driven by the power plant and transmission.

It should be understood that although FIG. 1 depicts a tractor, the present embodiments may be used on any suitable type of agricultural vehicles, such as combines and sprayers, for which ground propulsion provides a portion of or all of the vehicle's motion. Additionally, though the tractor 10 of FIG. 1 includes an articulated four-wheel drive, the present embodiments may be used on agricultural vehicles with other types of drive trains (e.g., front-wheel, rear-wheel, etc.) Further, while tracks are shown in the figure, other vehicles may use tire drives, or a combination of tires and tracks.

Each track 18 includes treads 20, a drive wheel 22, and at least one non-powered wheel 24 (e.g., idler wheel). The treads 20 may be a continuous band of rubber reinforced with steel wires and may contain holes, pegs, or other suitable engagement features. During operation, the drive wheel 22 rotates and engages with the holes or pegs in the treads 20, thereby directing the treads 20 to move and thus propel the tractor 10.

Each track 18 may include any number of suitable drive wheels 22 and/or non-powered wheels 24. The drive wheel 22 may be mounted in a fixed position, well above the ground, while the idler wheels 24 may provide a source of tension for the tracks 18 to keep the treads 20 from slipping off of the drive wheel 22 during operation. For example, FIG. 1 depicts a triangular track system configuration in which the drive wheel 22 acts as the apex of the triangle while the other two points are occupied by idler wheels 24. Further, the tracks 18 include at least one road wheel 26 that cushions the ride over rough terrain. As may be appreciated, the tracks configuration and number of wheels in FIG. 1 is merely an example, and the actual configuration of the tracks 18 may vary based on the agricultural vehicle.

Figure 2:
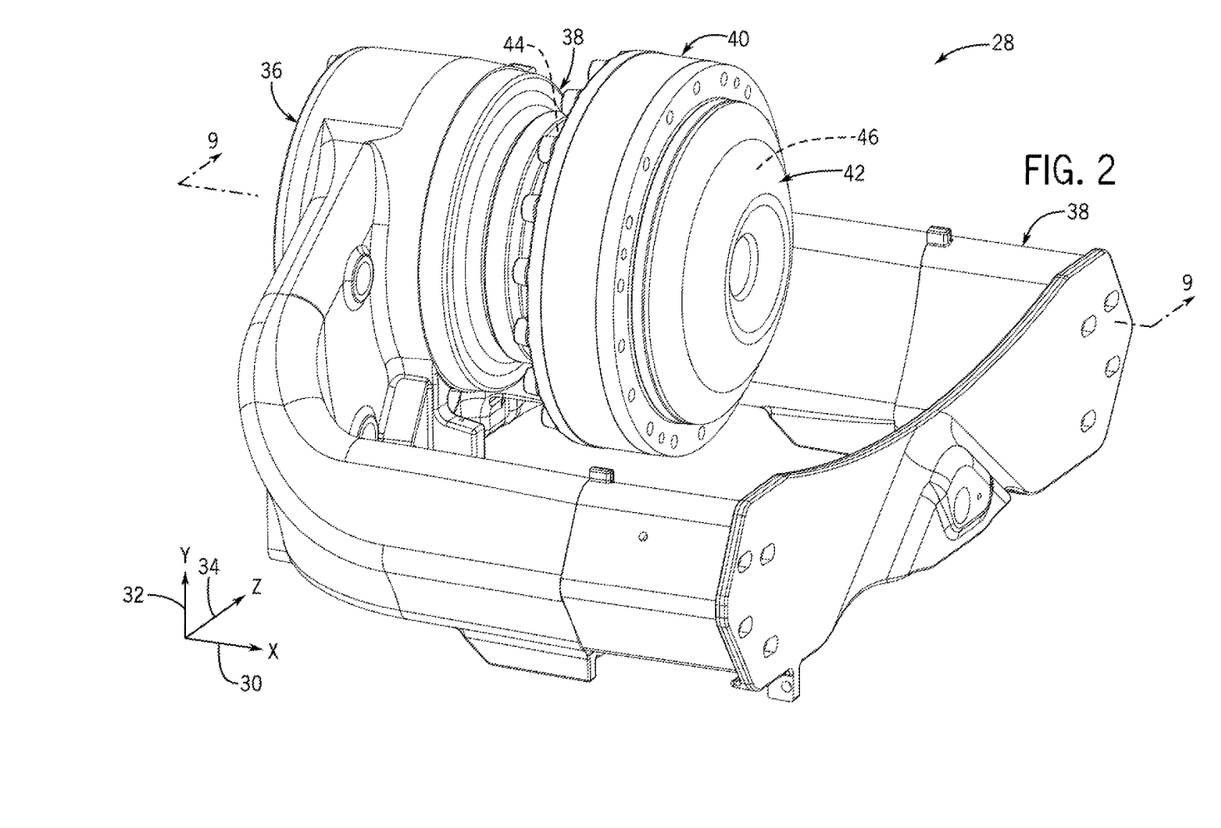
FIG. 2 is a perspective view of an embodiment of a portion of a drive wheel assembly of the tractor of FIG. 1.

FIG. 2 is a perspective view of an embodiment of a portion of a drive wheel assembly 28 of the tractor 10 of FIG. 1. The drive wheel assembly 28 includes the drive wheel 22 and translates power provided by the motor of the tractor 10 to rotational motion for driving the drive wheel 22. In certain embodiments, the tractor 10 may include a drive wheel assembly 28 for each drive wheel 22. As mentioned above, the drive wheel assembly 28, and its components, may be described relative to an x-axis 30, a y-axis 32, and a z-axis 34 which originate at the center of the tractor 10.

The drive wheel assembly 28 may include a translation assembly 36, a support assembly 38, a planet gear system 40, and a drive assembly 42, which are described in further detail below with respect to FIGS. 3-10. During operation, the translation assembly 36 may be driven by the power plant, motor, and/or transmission of the tractor 10. The translation assembly 36 may be coupled to the planet gear system 40 such that the translation assembly 36 drives components of the planet gear system 40 to rotate. The rotating components of the planet gear system 40 may be coupled to the drive assembly 42 such that the drive wheel assembly 28 rotates, propelling the tractor 10 as described above.

The drive wheel assembly 28 may also include a back bearing assembly 44 and a front bearing assembly 46 that together facilitate supported rotation of the drive wheel 22. The bearing assemblies 44 and 46 may be any suitable bearing assembly (e.g., ball bearing, roller bearing). The bearing assemblies 44 and 46 may facilitate supported rotation by minimizing friction between moving components, enabling rotation of components around a fixed axis, and/or reducing undesired motion caused by various forces during operation, among other things. The placement of the bearing assemblies 44 and 46 may reduce the load supported by each of the bearing assemblies. Further, the placement of the bearing assemblies may improve the weight distribution of the drive wheel assembly 28 relative to the tractor 10.

Figure 3:
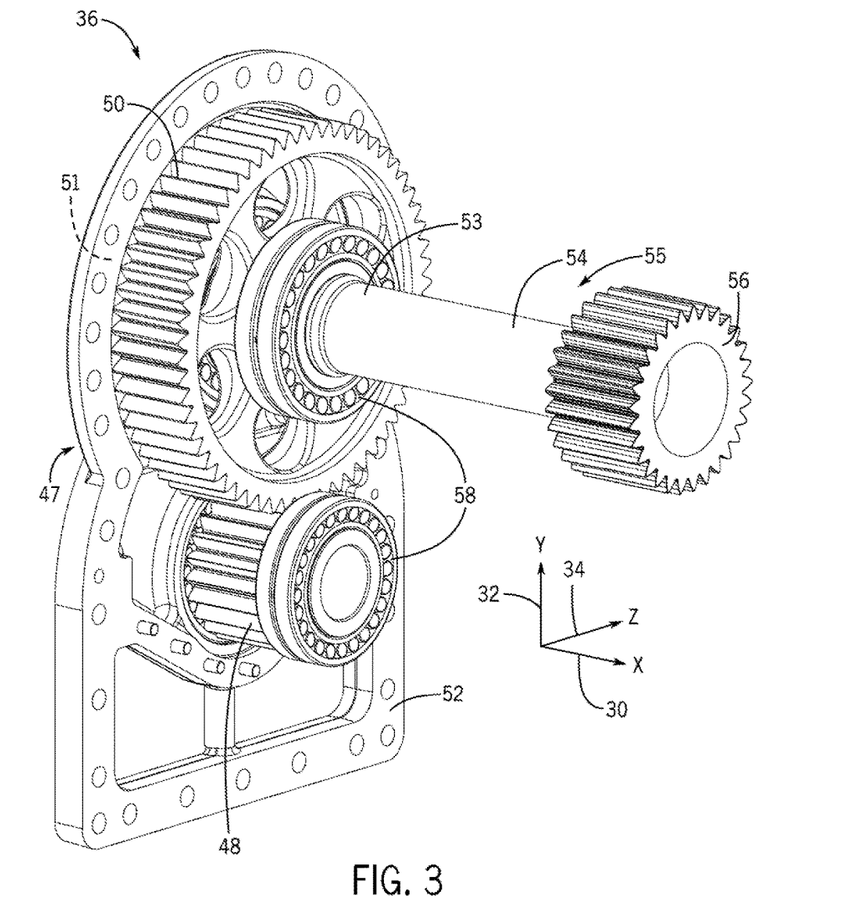
FIG. 3 is a perspective view of an embodiment of a translation assembly of the drive wheel assembly of FIG. 2.

FIG. 3 is a perspective view of an embodiment of the translation assembly 36 of the drive wheel assembly 28 of FIG. 2. The translation assembly 36 includes an offset gear assembly 47 and a central shaft 54. The offset gear assembly 47 includes an offset driver gear 48 and an offset driven gear 50 disposed within a support structure 52. The offset driven gear 50 includes a bore 51 through which the central shaft 54 is disposed. Specifically, a first end 53 of the central shaft 54 is disposed in the bore 51. Furthermore, a second end 55 of the central shaft 54 includes a sun gear 56. In certain embodiments, the central shaft 54 and the sun gear 56 are part of a one-piece structure. As may be appreciated, the central shaft 54 and the sun gear 56 may, in other embodiments, be two separate structures. The translation assembly 36 includes bearing assemblies 58 to facilitate rotation of the offset driver gear 48, the offset driven gear 50, and the central shaft 54.

As mentioned above, the translation assembly 36 may be driven by the power plant, motor, and/or transmission of the tractor 10. In particular, a dog bone shaft may be coupled to the offset driver gear 48 and may drive the offset driver gear 48 to rotate. The offset driver gear 48 drives the offset driven gear 50 to rotate, thereby rotating the central shaft 54. As the central shaft 54 rotates, the sun gear 56 is driven to rotate.

In other embodiments, the offset driver gear 48 may be driven by a drive axle that is coupled to the power plant, motor, and/or transmission of the tractor 10 and is coupled to the drive wheel assembly 28 at one or both ends. In yet other embodiments, the translation assembly 36 may not include an offset gear assembly 47; in such embodiments, a dog bone shaft may be directly coupled to the central shaft 54 and may directly drive the central shaft 54 to rotate. As will be discussed in further detail below, the bearing assemblies 44 and 46 may be disposed inside and outside, respectively, of the sun gear 56. The placement of the bearing assemblies 44 and 46 relative to the sun gear 56 may reduce the load supported by each bearing assembly, thus increasing the lifetime of the two components.

Figure 4:
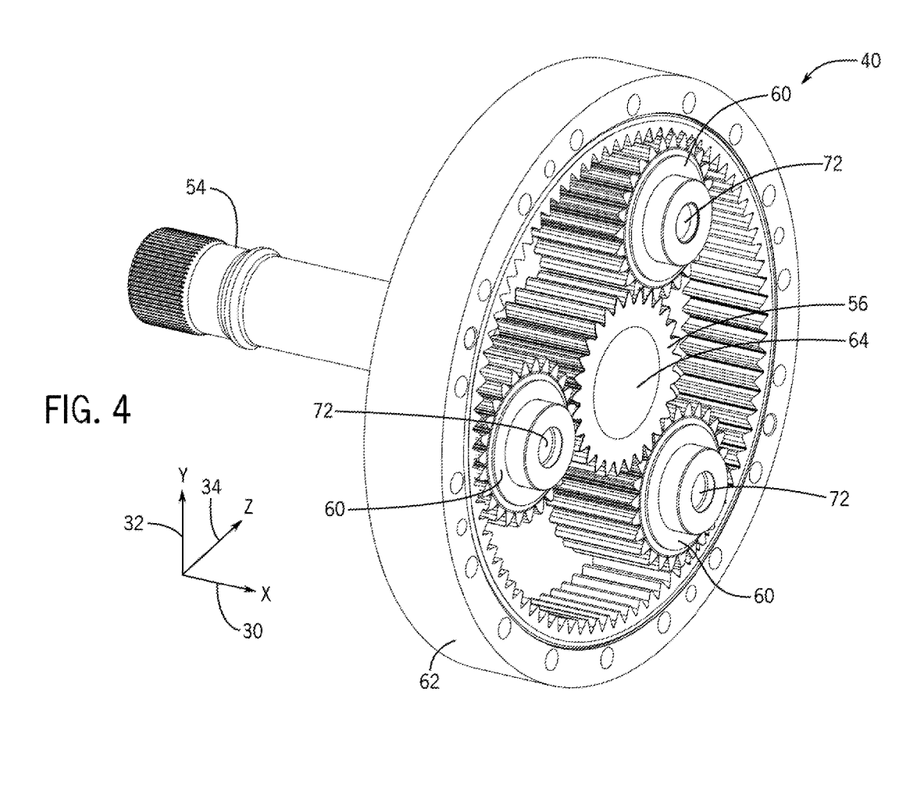
FIG. 4 is a perspective view of an embodiment of a planet gear system of the drive wheel assembly of FIG. 2 illustrated without a planet carrier.

FIG. 4 is a perspective view of an embodiment of the planet gear system 40 of the drive wheel assembly 28 of FIG. 2 illustrated without a planet carrier. As illustrated, the planet gear system 40 includes the sun gear 56, multiple planet gears 60, and a ring gear 62. The sun gear 56 includes a bore 64 through which certain components of the drive assembly 42 may be disposed. The planet gears 60 are disposed around the sun gear 56 such that the planet gears 60 are driven to rotate while the sun gear 56 rotates. Although FIG. 4 depicts three planet gears 60, it may be appreciated that the number of planet gears 60 may vary based on the configuration of the drive wheel assembly 28 (e.g., the planet gear system 40 may include 2, 4, 5, or more planet gears). Furthermore, the sun gear 56 and the planet gears 60 may include internal bearings that facilitate their rotation. The ring gear 62 includes a continuous structure disposed around the planet gears 60 such that rotation of the planet gears 60 drives the ring gear 62 to rotate. In certain embodiments, the ring gear 62 may be directly coupled to the drive assembly 42.

Figure 5:
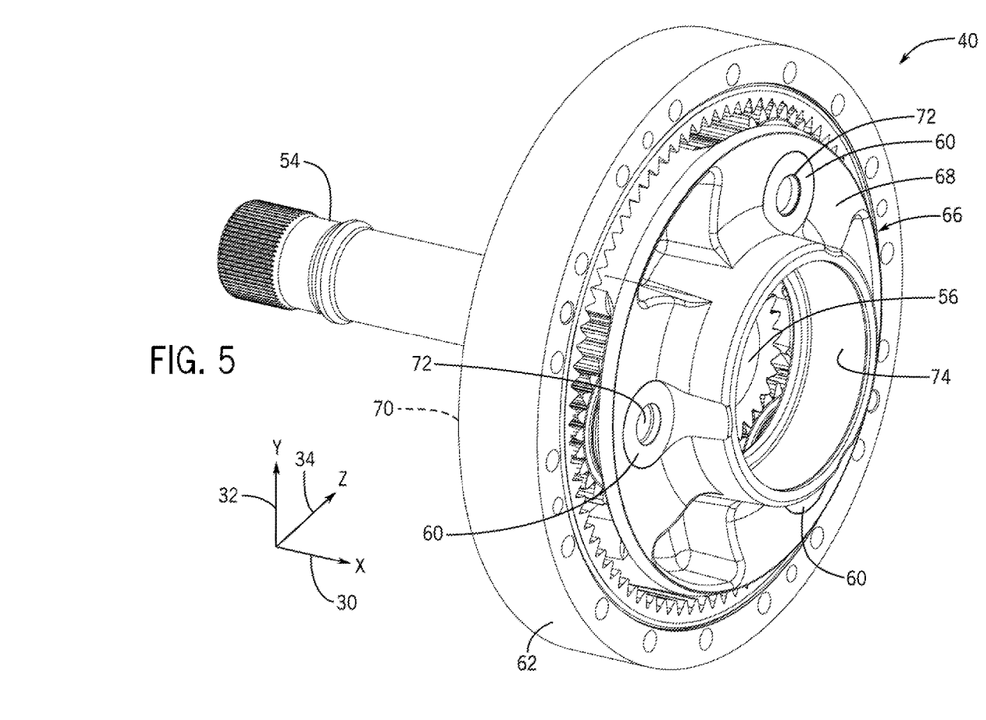
FIG. 5 is a front perspective view of an embodiment of a planet gear system of the drive wheel assembly of FIG. 2 illustrated with a planet carrier.

FIG. 5 is a front perspective view of an embodiment of the planet gear system 40 of the drive wheel assembly 28 of FIG. 2 illustrated with a planet carrier 66. The planet carrier 66 may be a two piece structure that includes an outside carrier section 68 and an inside carrier section 70 that may be coupled together to house the sun gear 56 and the planet gears 60. Each of the planet gears 60 includes a bore 72 in which a pin may be disposed. The pins may be inserted through openings in the outside carrier section 68 and the inside carrier section 70 to properly align the planet carrier 66 with the planet gears 60. The outside carrier section 68 includes a bore 74 that enables access to the bore 64 in the sun gear 56.

Figure 6:
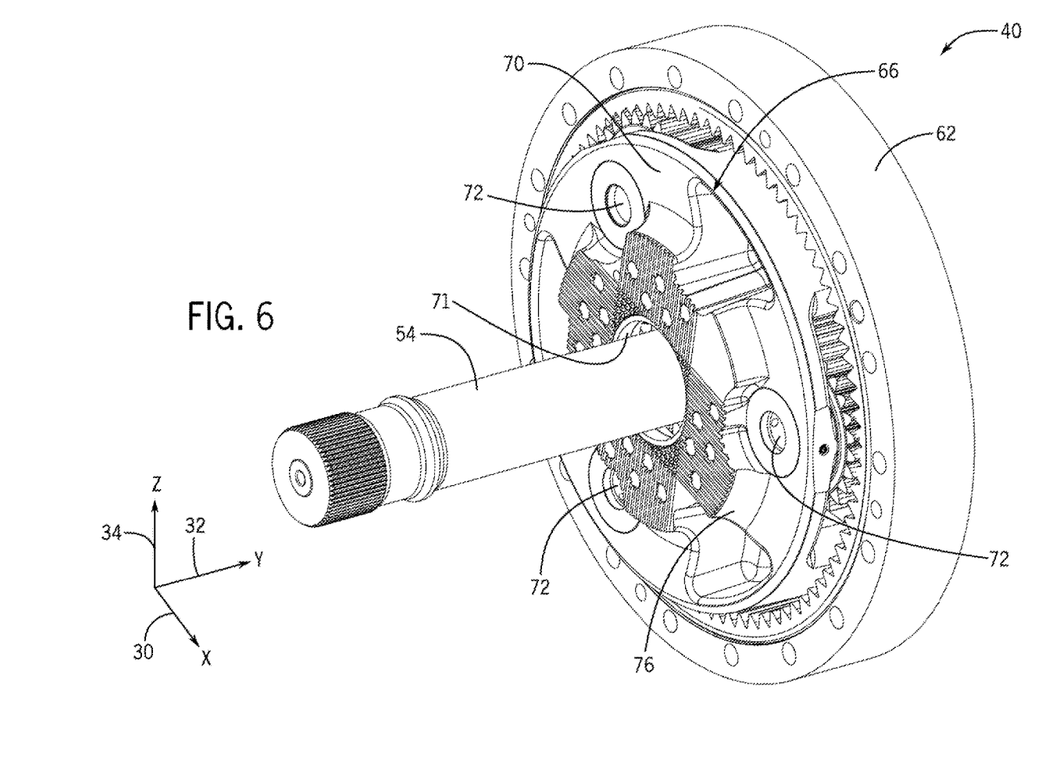
FIG. 6 is a back perspective view of an embodiment of the planet gear system of FIG. 5 illustrating an inside carrier section of the planet carrier.

FIG. 6 is a back perspective view of an embodiment of the planet gear system 40 of FIG. 5 illustrating the inside carrier section 70 of the planet carrier 66. The inside carrier section 70 may contain a bore 71 that surrounds a portion of the central shaft 54. The inside carrier section 70 may also contain a mount 76, which may be a portion of the inside carrier section 70 that extends away from the rest of the section. Using the mount 76, the inside carrier section 70, and by extension the planet carrier 66, may be coupled to selected components of the support assembly 38.

The bearing assemblies 44 and 46 may be a rolling-element type of bearing assembly, such as a ball or roller bearing assembly. The bearing assembly 44 includes an outer ring 77 having an external diameter 79 and an inner ring 81 having an internal diameter 83. Moreover, the bearing assembly 46 includes an outer ring 85 having an external diameter 87 and an inner ring 89 having an internal diameter 91. The bearing assemblies 44 and 46 include multiple bearing elements 93 (e.g., balls, rollers) disposed between the outer rings and inner rings.

Figure 7:
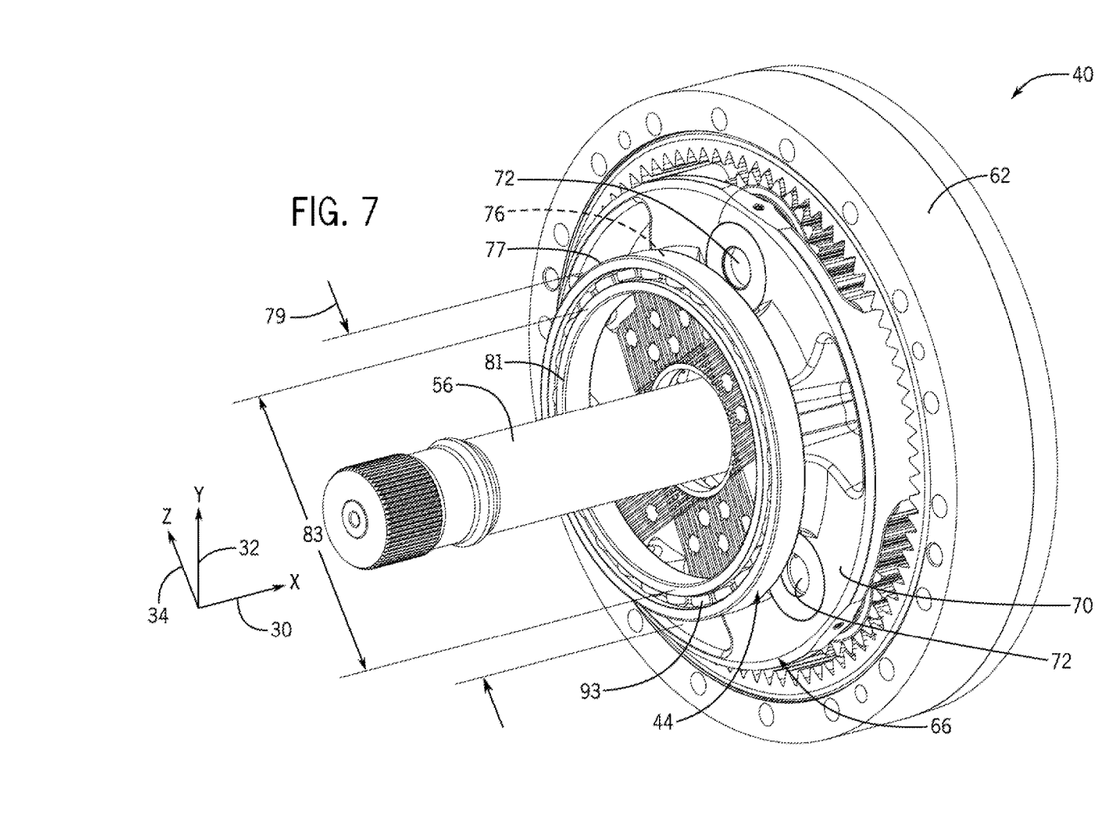
FIG. 7 is a back perspective view of an embodiment of a planet gear system of the drive wheel assembly of FIG. 2 illustrated with a back bearing assembly.

FIG. 7 is a back perspective view of an embodiment of the planet gear system 40 of the drive wheel assembly 28 of FIG. 2 illustrated with the back bearing assembly 44. As mentioned above, the drive wheel assembly 28 includes the back bearing assembly 44 and the front bearing assembly 46 to facilitate rotation of the gears of the planet gear system 40. The back bearing assembly 44 is disposed around the mount 76, as illustrated. In some embodiments, the back bearing assembly 44 may be disposed inside (e.g., encompassed by) the planet gear system 40. As illustrated, the back bearing assembly 44 has an internal diameter 83.

Figure 8:
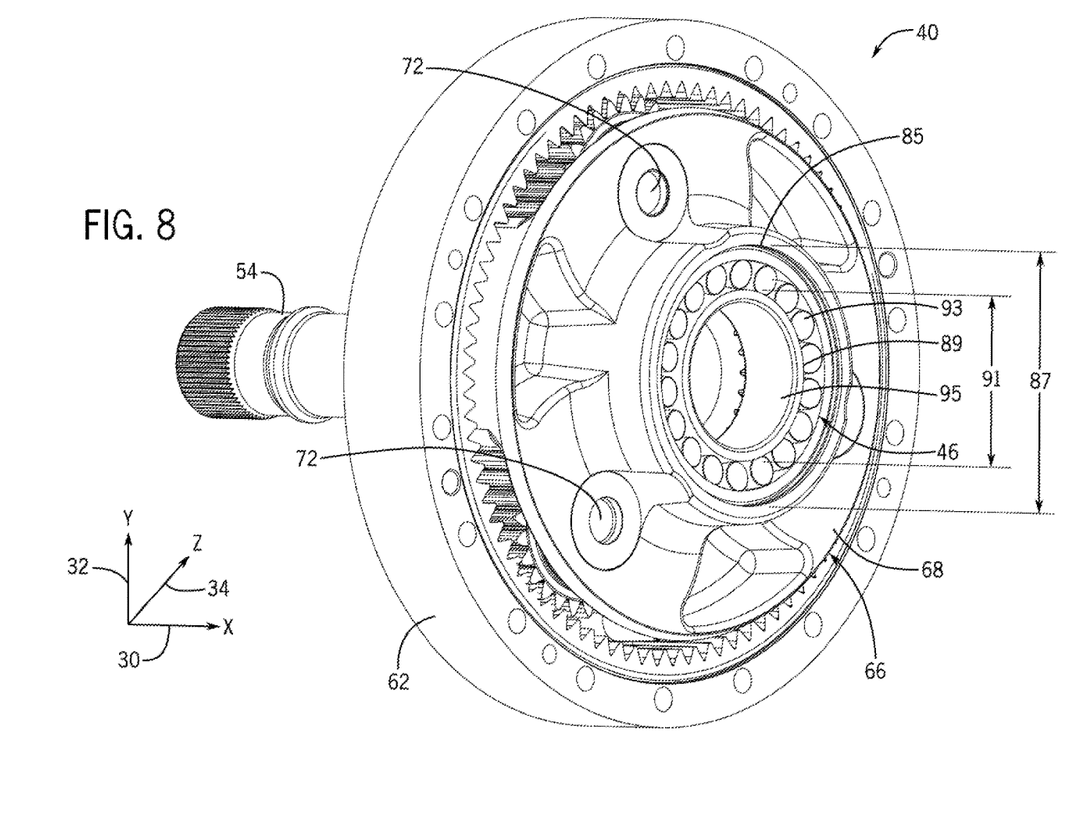
FIG. 8 is a front perspective view of an embodiment of the planet gear system of FIG. 7 illustrated with a front bearing assembly.

FIG. 8 is a front perspective view of an embodiment of the planet gear system 40 of FIG. 7 illustrated with the front bearing assembly 46. The front bearing assembly 46 is disposed inside the bore 74 of the planet carrier 66 (e.g., encompassed by the planet carrier 66), and enables access to the bore 64 of the sun gear 56. As illustrated, the front bearing assembly 46 has an internal diameter 91. In the illustrated embodiment, the internal diameter 83 of the back bearing assembly 44 is larger than the internal diameter 91 of the front bearing assembly 46. In some embodiments, the front bearing assembly 46 may be disposed around a portion of the planet gear system 40 or the planet carrier 66.

The location of the bearing assemblies 44 and 46 within the drive wheel assembly 28 (e.g., on opposing sides of the planet gear system 40) may improve the weight and load distribution of the drive wheel assembly 28. Particularly, the location of the bearing assemblies 44 and 46 may reduce the load carried by each of the bearings and may even the weight distribution across the drive wheel assembly 28. Furthermore, the planet carrier 66 may provide support to the back bearing assembly 44 when the back bearing assembly 44 is disposed around the mount 76, which may also reduce the load carried by the back bearing assembly 44. The planet carrier 66 may also support the front bearing assembly 46 in certain embodiments.

During operation, the rotating components of the translation assembly 36 drive the sun gear 56, as described above. The rotating sun gear 56 drives the planet gears 60 to rotate as well. In turn, the planet gears 60 drive the ring gear 62 to rotate. Furthermore, as noted above, certain components of the drive assembly 42 may be coupled to the sun gear 56 via the bores 64 and 74, and as such may be driven by the sun gear 56 to rotate during operation. However, the planet carrier 66, which provides a support structure for the sun gear 56, the planet gears 60, and the back bearing assembly 44 are configured to not rotate during operation. Likewise, the pins disposed in bores 72 are configured to not rotate during operation.

Figure 9:
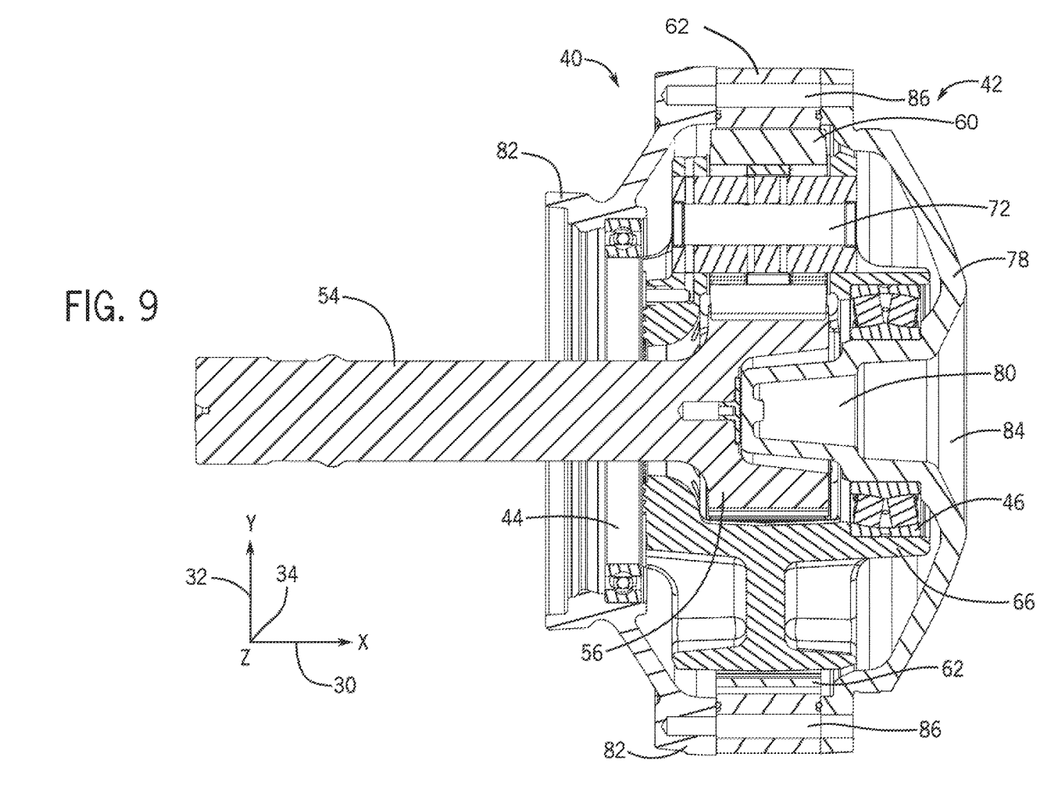
FIG. 9 is a cross-sectional view of an embodiment of a planet gear system of the drive wheel assembly of FIG. 2 illustrating a front bearing assembly and a back bearing assembly.

FIG. 9 is a cross-sectional view of an embodiment of the planet gear system 40 of the drive wheel assembly 28 of FIG. 2 illustrating the front bearing assembly 46 and the back bearing assembly 44. As illustrated, the drive assembly 42 includes a cover 78 which has a bore 80. The drive assembly 42 also includes a hub 82 and a plug 84. The cover 78 is disposed adjacent to the planet gear system 40 and may be configured to block the planet gear system 40 from contacting debris and dirt during operation. In particular, the cover 78 is disposed within the bore 95 created by the front bearing assembly 46 and around the bore 74 in the planet carrier 66. In addition, the cover 78 is attached to the ring gear 62 using bolts inserted into bores 86. The bore 80 within the cover 78 may enable access to the bores 64 and 74 of the planet gear system 40. In the illustrated embodiment, the cover 78 may provide structural support to the inner circumference of the front bearing assembly 46.

The hub 82 is a structure that surrounds the outside of the planet gear system 40, the outside of the back bearing assembly 44, and a portion of the central shaft 54. As illustrated, the hub 82 is attached to one side of the ring gear 62 while the cover 78 is attached to an opposite side of the ring gear 62 using the bolts 86. The plug 84 is disposed within the bores 64, 74, and 80, as illustrated. Specifically, the plug 84 may be configured to fill the bores 64, 74, and 80. The plug 84 may also be coupled to the drive wheel 22, and may provide structural support for the drive wheel 22 during operation. In alternate embodiments, the plug 84 may not be a separate component, but rather an extending portion of the drive wheel 22.

As mentioned above, certain components of the planet gear system 40, particularly the sun gear 56 and the ring gear 62, rotate during operation. Because the cover 78 is attached to the ring gear 62, the cover 78 rotates during operation. Furthermore, the hub 82 rotates as it is also coupled to the ring gear 62, particularly via bolts extending into bores 86 through the planetary ring gear 62. The plug 84, which is disposed within the bore 64 and the bore 74 on the cover 78, also rotates during operation. As the plug 84 may be coupled to or an extension of the drive wheel 22, the rotating plug 84 causes the drive wheel 22 to rotate. In sum, the translation assembly 36 is driven by the motor of the tractor 10 and drives certain components of the planet gear system 40; the rotating components of the planet gear system 40 drive the drive assembly 42, which causes the drive wheel 22 to rotate, as described above.

The proximity between the planet gear system 40, the drive assembly 42, and the drive wheel 22 may improve the spatial distribution of the drive wheel assembly 28. For example, the planet gear system 40 may be described as being in the outer portion of the drive wheel assembly 28 in certain embodiments. This, in turn, may reduce the likelihood of interference between components of the planet gear system 40 and other components of the tractor 10 during operation. Further, the location of the planet gear system 40 may increase the amount of space around its components, thereby enabling engineers to select larger components for the planet gear system 40 that may handle increased amounts of power supplied by the motor. Additionally, the proximity of the planet gear system 40 to the drive wheel 22 may also cause dirt and debris (e.g., mud) that collects between the drive wheel 22 and the treads 20 to fall out during operation.

Figure 10:
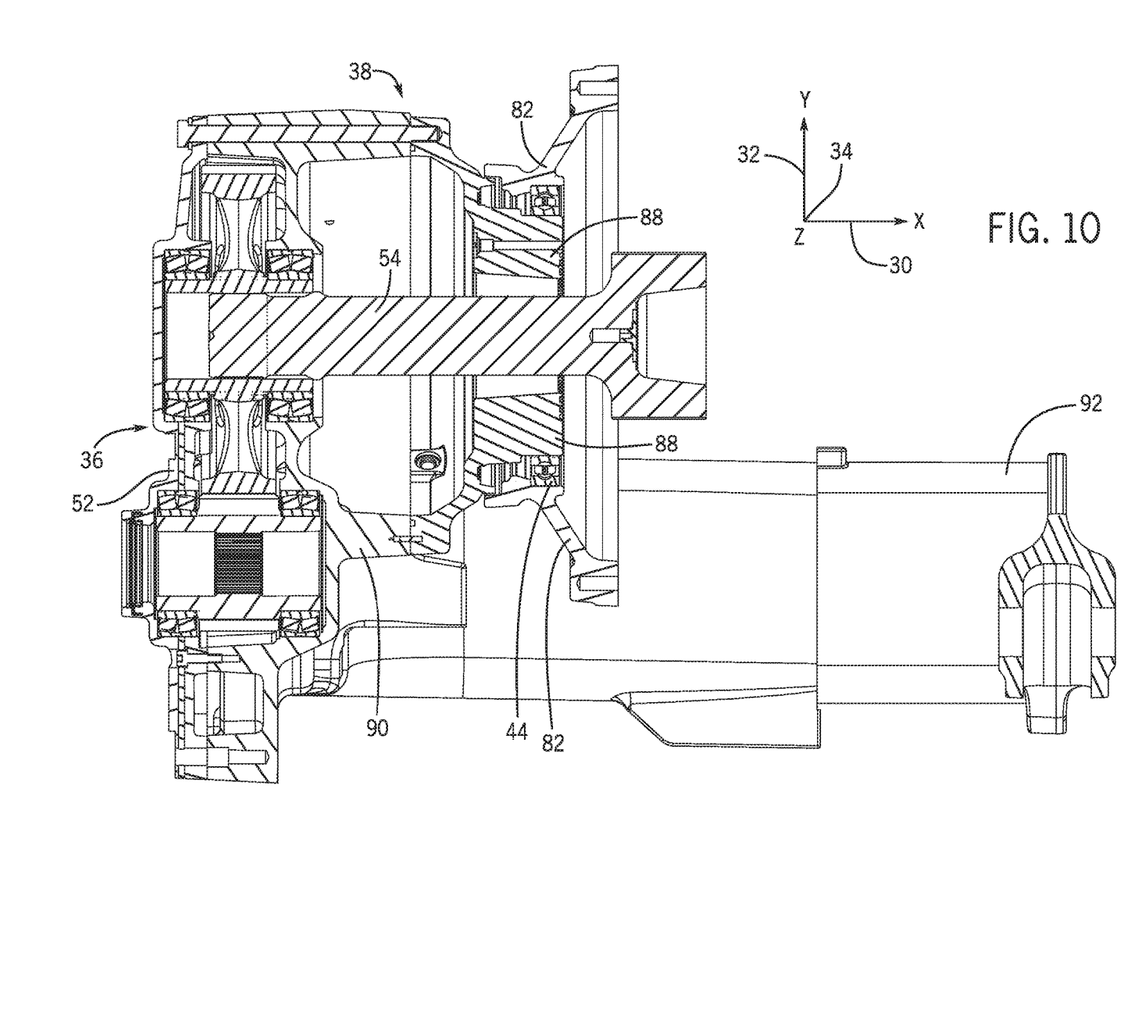
FIG. 10 is a cross-sectional view of an embodiment of a support assembly, a translation assembly, and a back bearing assembly of the drive wheel assembly of FIG. 2.

FIG. 10 is a cross-sectional view of an embodiment of the support assembly 38, the translation assembly 36, and the back bearing assembly 44 of the drive wheel assembly 28 of FIG. 2. The drive wheel assembly 28 includes a spindle 88 that includes a bore that surrounds the central shaft 54. The support assembly 38 may be a set of structures that remain stationary during operation and provide structural support for the moving components of the drive wheel assembly 28. The support assembly 38 may include the spindle 88, a yoke 90, and a projection 92. The spindle 88 is a structure that houses a portion of the central shaft 54. In certain embodiments, a portion of the spindle 88 may be disposed between the back bearing assembly 44 and the mount 76 on the inside carrier section 70. The spindle 88 may also be coupled to the planet carrier 66 via other means (e.g., bolts, welds, etc.).

The yoke 90 is a structure that houses the offset gear assembly 47 and a portion of the central shaft 54. In some embodiments, the yoke 90 and the offset support structure 52 may be a one-piece structure. The yoke 90 is coupled to the spindle 88 using bolts or any other suitable means. In certain embodiments, the yoke 90 may extend outward to form a rectangular projection 92 that surrounds the lower portion of the drive wheel assembly 28. In other embodiments, the rectangular projection 92 may be a separate structure coupled to the yoke 90 and/or may be disposed at different heights around the drive wheel assembly 28.

One or more of the disclosed embodiments, alone or in combination, may provide one or more technical effects useful for drive wheel assemblies in agricultural vehicles. Certain embodiments may improve the spatial distribution of components within drive wheel assemblies. For example, the drive wheel assembly may include a planet gear system located in the outer portion of the drive wheel assembly. The location of the planet gear system may reduce the likelihood of interference between components of the planet gear system and other components of the agricultural vehicle during operation. Additionally, the location of the planet gear system may have an increased amount of space around the components of the planet gear system. As such, larger components that can handle increased amounts of power supplied by the vehicle motor may be used in the drive wheel assembly. Further, the location of the planet gear system may also operate as a self-cleaning feature of the drive wheel assembly. That is, the location of the planet gear system may direct dirt and debris accumulated within the drive wheel assembly to fall out during operation, essentially cleaning the drive wheel assembly. Other embodiments may improve the weight and load distribution of components within drive wheel assemblies. For example, the drive wheel assembly may include two bearing assemblies and a planet gear system that includes a planet carrier. The planet carrier may support at least one bearing assembly, which may reduce the load on the supported bearing assembly. Further, the two bearing assemblies may be located on either side of the planet gear system, which may reduce the load carried by each of the bearing assemblies and may even the weight distribution across the drive wheel assembly. The technical effects and technical problems in the specification are exemplary and not limiting. It should be noted that the embodiments described in the specification may have other technical effects and may solve other technical problems.

While only certain features of the embodiments have been illustrated and described herein, many modifications and changes will occur to those skilled in the art. It is, therefore, to be understood that the appended claims are intended to cover all such modifications and changes as fall within the true spirit of the subject matter.

The invention claimed is:

1. An agricultural vehicle comprising:
   a drive wheel assembly comprising:
   a central shaft configured to be driven by a motor of the agricultural vehicle to rotate;
   a planet gear system configured to be driven by the central shaft, wherein the planet gear system comprises:
   a sun gear coupled to the central shaft;
   a plurality of planet gears disposed around the sun gear and configured to be driven by the sun gear;
   a ring gear disposed around the plurality of planet gears and configured to be driven by the plurality of planet gears; and
   a planet carrier directly coupled to each planet gear of the plurality of planet gears and configured to provide support to each planet gear;
   a cover coupled to the ring gear such that the cover rotates with the ring gear during operation of the drive wheel assembly;
   a first bearing assembly encompassed by the planet carrier, wherein the planet carrier is configured to support the first bearing assembly, and a portion of the cover is disposed within a bore of the first bearing assembly, such that the first bearing assembly is radially disposed between the portion of the cover and the planet carrier; and
   a second bearing assembly disposed around a portion of the planet carrier.

2. The agricultural vehicle of claim 1, wherein the central shaft and the sun gear are a one-piece structure.

3. The agricultural vehicle of claim 1, wherein the drive wheel assembly comprises an offset driver gear configured to be driven by the motor and an offset driven gear configured to be driven by the offset driver gear, wherein the central shaft is configured to be driven by the offset driven gear.

4. The agricultural vehicle of claim 1, wherein the drive wheel assembly comprises a drive wheel configured to be driven by the ring gear.

5. The agricultural vehicle of claim 1, wherein the cover is disposed around a portion of the planet gear system.

6. The agricultural vehicle of claim 1, wherein the drive wheel assembly comprises a hub coupled to the cover.

7. The agricultural vehicle of claim 1, wherein the first bearing assembly has a first internal diameter, the second bearing assembly has a second internal diameter, and the first internal diameter is less than the second internal diameter.

8. An agricultural vehicle comprising:
   a drive wheel assembly comprising:
   a central shaft configured to be driven by a motor of the agricultural vehicle to rotate;
   a planet gear system configured to be driven by the central shaft, wherein the planet gear system comprises:
   a sun gear coupled to the central shaft;
   a plurality of planet gears disposed around the sun gear and configured to be driven by the sun gear;
   a ring gear disposed around the plurality of planet gears and configured to be driven by the plurality of planet gears; and
   a planet carrier directly coupled to each planet gear of the plurality of planet gears and configured to provide support to each planet gear;
   a cover coupled to the ring gear such that the cover rotates with the ring gear during operation of the drive wheel assembly; and
   a first bearing assembly and a second bearing assembly, wherein the first bearing assembly is encompassed by the planet carrier, the second bearing assembly is disposed around a portion of the planet carrier, the planet carrier is configured to support the first bearing assembly, a portion of the cover is disposed within a bore of the first bearing assembly, such that the first bearing assembly is radially disposed between the portion of the cover and the planet carrier, and the first and second bearing assemblies are disposed on opposing sides of the planet gear system.

9. The agricultural vehicle of claim 8, wherein the drive wheel assembly comprises a drive wheel configured to be driven by the ring gear.

10. The agricultural vehicle of claim 8, wherein the cover is disposed around a portion of the planet gear system.

11. The agricultural vehicle of claim 8, wherein the drive wheel assembly comprises a hub coupled to the cover.

12. The agricultural vehicle of claim 8, wherein the drive wheel assembly comprises an offset driver gear configured to be driven by the motor and an offset driven gear configured to be driven by the offset driver gear, wherein the central shaft is configured to be driven by the offset driven gear.

13. The agricultural vehicle of claim 8, wherein the first bearing assembly has a first internal diameter, the second bearing assembly has a second internal diameter, and the first internal diameter is less than the second internal diameter.

14. An agricultural vehicle comprising:
   a drive wheel assembly comprising:
   a central shaft configured to be driven by a motor of the agricultural vehicle to rotate;
   a planet gear system configured to be driven by the central shaft, wherein the planet gear system comprises:
   a sun gear coupled to the central shaft;
   a plurality of planet gears disposed around the sun gear and configured to be driven by the sun gear;
   a ring gear disposed around the plurality of planet gears and configured to be driven by the plurality of planet gears; and
   a planet carrier directly coupled to each planet gear of the plurality of planet gears and configured to provide support to each planet gear;
   a cover coupled to the ring gear such that the cover rotates with the ring gear during operation of the drive wheel assembly; and
   a first bearing assembly and a second bearing assembly, wherein the planet carrier supports the first bearing assembly, the second bearing assembly, or some combination thereof, the first bearing assembly is encompassed by the planet carrier, the second bearing assembly is disposed around a portion of the planet carrier, a portion of the cover is disposed within a bore of the first bearing assembly, such that the first bearing assembly is radially disposed between the portion of the cover and the planet carrier, and the first and second bearing assemblies are disposed on opposing sides of the planet gear system.

15. The agricultural vehicle of claim 14, wherein the drive wheel assembly comprises a drive wheel configured to be driven by the ring gear.

16. The agricultural vehicle of claim 14, wherein the cover is disposed around a portion of the planet gear system.

17. The agricultural vehicle of claim 14, wherein the drive wheel assembly comprises a hub coupled to the cover.

18. The agricultural vehicle of claim 14, wherein the drive wheel assembly comprises an offset driver gear configured to be driven by the motor and an offset driven gear configured to be driven by the offset driver gear, wherein the central shaft is configured to be driven by the offset driven gear.

19. The agricultural vehicle of claim 14, wherein the first bearing assembly has a first internal diameter, the second bearing assembly has a second internal diameter, and the first internal diameter is less than the second internal diameter.

* * * * *